United States Patent

Wada et al.

[11] Patent Number: 5,337,174
[45] Date of Patent: Aug. 9, 1994

[54] OPTICAL COMPENSATOR AND LIQUID CRYSTAL DISPLAY

[75] Inventors: Hiroshi Wada; Shinji Wada; Osamu Okumura, all of Suwa; Rinjiro Ichikawa, Tokyo; Kenji Hashimoto, Tokyo; Takashi Yamada, Tokyo, all of Japan

[73] Assignees: Seiko Epson Corporation; Fujimori Kogyo Co. Ltd., Tokyo, Japan

[21] Appl. No.: 969,156
[22] PCT Filed: Jun. 15, 1992
[86] PCT No.: PCT/JP92/00762
§ 371 Date: Apr. 14, 1993
§ 102(e) Date: Apr. 14, 1993
[87] PCT Pub. No.: WO92/22836
PCT Pub. Date: Dec. 23, 1992

[30] Foreign Application Priority Data

Jun. 17, 1991 [JP] Japan .................. 3-173183

[51] Int. Cl.$^5$ .......................................... G02F 1/1335
[52] U.S. Cl. .......................................... 359/73; 359/63
[58] Field of Search ..................... 359/63, 73, 102, 106

[56] References Cited

U.S. PATENT DOCUMENTS 5,061,042 10/1991 Nakamura et al. ............... 359/63
5,142,393 8/1992 Okumura et al. ............... 359/73

FOREIGN PATENT DOCUMENTS 1-118805 5/1989 Japan .
2-42406 2/1990 Japan .
3-33719 2/1991 Japan .

Primary Examiner—William L. Sikes
Assistant Examiner—Huy Mai
Attorney, Agent, or Firm—Armstrong, Westerman, Hattori, McLeland & Naughton

[57] ABSTRACT

There is provided a laminate consisting of a first oriented film (1) obtainable by drawing, at least in one direction, a polymer film having a refractive index of $n_D \geq 1.60$, an Abbe number of $\nu_D \geq 30.0$ and a glass transition temperature of $Tg = 60°$ to $160°$ C. and a second oriented film (2) obtainable by drawing, at least in one direction, a polymer film having a refractive index of $n_D < 1.60$. The laminate has a retardation value R of 60–1000 nm and a wavelength dispersion value $\nu_{RF}$ of not less than 1.10. This oriented film either as it is or as laminated with an optically isotropic film at least on one side is used to fabricate an optical compensator for color compensation in a liquid crystal panel. In this manner, there can be obtained a liquid crystal display panel which solves the long-standing problems of coloration and low contrast ratio.

20 Claims, 5 Drawing Sheets

OPTICAL COMPENSATOR AND LIQUID CRYSTAL DISPLAY

TECHNICAL FIELD

The present invention relates to an optical compensator capable of providing a liquid crystal display device with improved display coloration and contrast ratio.

BACKGROUND ART

As a liquid crystal display device utilizing a supertwisted nematic structure, an STN liquid crystal display of the construction: first polarizer/driver liquid crystal cell/hue compensating liquid crystal cell/second polarizer system has been developed [Nikkei Microdevices, August 1987, pp. 36-38 and Nikkei Microdevices, October 1987, pp. 84-88].

The light incident on and passing through the first polarizer becomes linear polarized light which, in turn, is converted to elliptically polarized light by birefringence as it passes through the driver liquid crystal cell. The elliptic polarization rate and orientational angle involved are dependent on the wavelength. However, the light emerging from the driver liquid crystal cell is twisted in the reverse direction as it passes through the hue-compensating liquid crystal cell, so that the elliptically polarized light is reconverted to linearly polarized light (that is to say the phase difference is cancelled), which is taken out through the second polarizer. In this way, the wavelength dependence of transmitted light is eliminated and a substantially white-and-black display is obtained. Therefore, if necessary, a full-color display can be implemented by adding color filters.

The above STN liquid crystal display incorporating a driver liquid crystal cell and a hue compensating liquid crystal cell is thick and heavy and, as an additional disadvantage, costly to manufacture. There also is the problem that the display is too dark in the reflecting mode.

Therefore, to overcome these disadvantages, a Formulated Super-Twisted Nematic system (hereinafter referred to as FTN mode) incorporating an optical compensator comprising a monoaxially oriented polymer film laminated with an optically isotropic film on either side thereof in lieu of said hue compensating liquid crystal cell is attracting attention. The basic architecture of this FTN liquid crystal display is: polarizer/liquid crystal cell/optical compensator/polarizer.

Japanese Patent Application Kokai No. 64-519, as filed earlier by one of the inventors of the present invention, discloses that, as the monoaxially oriented film mentioned above, polyvinyl alcohol, polyester, polyetheramide, polyethylene, etc. can be employed.

Japanese Patent Application Kokai No. 1-118805 describes an optical compensator obtainable by orienting a film of polyvinyl alcohol or a derivative thereof in one direction, treating the oriented film with an aqueous boric acid-containing solution and laminating an optically non-oriented poller film on one or either side of said oriented film. The derivative of polyvinyl alcohol mentioned above means a polyvinylacetal such as polyvinylbutyral, polyvinylformal, etc.

Japanese Patent Application Kokai No. 1-118819 and Japanese Patent Application Kokai No. 1-124821 disclose the use of an optically compensating film comprising an oriented synthetic resin film or an optical compensator comprising said optically compensating film and an optically isotropic amorphous film laminated at least on one side thereof as one of the transparent electrode-supporting substrates of a liquid crystal cell. Japanese Patent Application Kokai No. 1-127329 discloses a laminate having an optical compensating function which is obtainable by laminating an optical compensator similar to the above with a release sheet through an adhesive layer. It is disclosed in these patent literature that polycarbonate, phenoxy resin, polyparabanic acid resin, fumaric acid resin, polyamino acid resin, polystyrene, polysulfone, polyether polysulfone, polyarylene ester, polyvinyl alcohol, ethylene-vinyl alcohol copolymer, polyvinyl chloride, polymethyl methacrylate, polyester, cellulosic polymer, etc. can be employed. Incidentally, it is to be noted that these patent applications as well as Japanese Patent Application Kokai No. 2-158701 referred to below are all those filed by another applicant among the present applicants.

Japanese Patent Application Kokai No. 2-158701 discloses a composite optical compensator comprising a birefringent multi-layer film obtainable by laminating a plurality of low-oriented birefringent unit cast films having a retardation value of 30 to 1000 nm with alignment of respective optic axes and, as film materials, mentions crosslinking resins such as phenoxyether crosslinking resin, epoxy resin, acrylic resin, urethane resin, etc., polycarbonate, polyarylene ester, polyethersulfone, polysulfone, polyethylene terephthalate, polybutylene terephthalate, polyvinyl chloride, polystyrene, ethylene-vinyl alcohol copolymer, polyvinyl alcohol, amorphous polyolefin, fumaric acid resin, polyamino acid resin, ABS resin and so on.

Japanese Patent Application Kokai No. 2-256003 discloses an optical film, primarily intended for an optical compensator, which is obtainable by orienting a thermoplastic polymer film without thickness variation monoaxially at right angles with the extruding direction or biaxially and having a retardation value of not more than 1200 nm with a variance of not more than 10% in retardation value and, as said thermoplastic polymer, mentions polycarbonate resin, poly(meth)acrylate resin, polystyrene resin, acrylonitrile resin, polyester resin (polyethylene terephthalate, polyester copolymer, etc.), polyamide resin, polyvinyl chloride, polyolefin resin, polysulfone, polyethersulfone, fluororesin and so on.

Japanese Patent Application Kokai No. 2-256023 discloses a liquid crystal display including a film of planarly oriented molecules having a negative intrinsic birefringence value and a monoaxially oriented film of a polymer having a positive birefringent value as interposed between a liquid crystal cell and a polarizer, and mentions, as examples of the former polymer, polystyrene and acrylate pollers and, as examples of the latter polymer, polycarbonate, polyarylate, polyethylene terephthalate, polyethersulfone, polyphenylene sulfide, polyphenylene oxide, polyallylsulfone, polyamideimde, polyolefin, polyacrylnitrile, cellulose and polyester.

Japanese Patent Application Kokai No. 2-257103 teaches an optical compensator comprising a laminate of an optically compensating film obtainable by monoaxial orientation of a polyvinyl alcohol film and having a retardation value of 300 to 800 nm with a polysulfone or polyarylate film.

However, with any of the optically compensating films comprising monoaxially oriented films formed from the polymers described in the above profusion of literature or any of the optical compensators fabricated by laminating an optically isotropic film on one or either side of said optically compensating film, irrespective of whether the monoaxially oriented optically compensating film is used in a single layer or in a plurality of layers, it is impossible to compensate for the phase difference caused by the STN cell over the entire wavelength region, thus failing to fully solve the problems of coloration and low contrast ratio. Therefore, although these technologies are able to solve the problems of great thickness and weight which are inevitable with the STN liquid crystal display mode employing a driver liquid crystal cell and a hue compensating liquid crystal cell, they are inferior to the mode employing a hue compensating liquid crystal cell in coloration and contrast ratio. This aspect is an important problem to be solved of the FTN mode employing an optical compensator made of polymer film.

The object of the present invention is to provide a radical solution to the long-standing problems of coloration and low contrast ratio in the FTN mode employing an optically compensating film or an optical compensator for hue compensation in a liquid crystal display.

DISCLOSURE OF INVENTION

The optical compensator of the present invention is a laminate film comprising (1) a first oriented film obtainable by orienting, at least in one direction, a polymer film having a refractive index of $n_D \geq 1.60$, an Abbe number of $\nu_D \leq 30.0$ and a glass transition temperature of 60°–160° C. and (2) a second oriented film obtainable by orienting, at least in one direction, a polymer film having a refractive index of $n_D < 1.60$.

It is particularly preferable that the retardation value R of the laminated film is 60–1000 nm and that the wavelength dispersion value $\nu_{RF}$, which is defined below, of the first oriented film (1) of the laminate is not less than 1.10.

$$\nu_{RF} = \Delta n \cdot d \ (450 \ nm)/\Delta n \cdot d \ (590 \ nm)$$

The present invention is now described in detail hereinafter.

First oriented film (1)

As mentioned above, the first oriented film (1) is an oriented film which is obtainable by orienting, at least in one direction, a polymer film which satisfies all of the following requirements, namely Refractive index $n_D \geq 1.60$
Abbe number $\nu_D \geq 30.0$
Glass transition temperature $T_g = 60°–60°$ C.

The refractive index $n_D$ stands for the refractive index relative to the sodium D line (589 nm) as measured in accordance with ASTM D-542. If the refractive index $n_D$ is less than 1.60, the problems of coloration and low contrast ratio cannot be solved even if the other requirements are met.

The Abbe number $\nu_D$ is an indicator expressed by the equation $\nu_D = (n_D - 1)/(n_F - n_C)$, wherein $n_D$, $n_F$ and $n_C$ are refractive indices with respective to the D line (589 nm), F line (486 nm) and C line (656 nm), respectively. If this Abbe number exceeds 30.0, the problems of coloration and low contrast ratio cannot be solved even if the other requirements are met.

It is also necessary that the glass transition temperature $T_g$ is within the range of 60° to 160° C. If the glass transition temperature is below 60° C., heat resistance will be inadequate. On the other hand, drawability is scarified when the glass transition temperature exceeds 160° C.

As polymers that may provide polymer films meeting all of the above three requirements, there can be mentioned, among others, brominated or chlorinated phenoxyether polymer, polyethylene naphthalate, bisphenol-aromatic dicarboxylic acid polycondensate, polyvinylnaphthalene, polyvinylcarbazole, polypentabromophenyl methacrylate, polypentachlorophenyl methacrylate, poly($\alpha$-naphthyl methacrylate), poly(p-divinylbenzene) and so on. What is essential is that the film ultimately meet the above refractive index $n_D$, Abbe number $\nu_D$ and glass transition temperature $T_g$ requirements; that is to say it may be a copolymer (inclusive of graft copolymer) film, a film of coexisting polymers, a post-modified polymer film, a polymer blend film composed of two or more polymers with dissimilar characteristic values, or a laminate of a plurality of polymer films.

Among the above polymers, brominated or chlorinated phenoxyether crosslinking resin and polyethylene naphthalate are particularly important. While the characteristic values of these polymer films are dependent on the molecular weight, film-forming technology and degree of halogenation, among other things, some typical characteristics values are shown below.

|  | $n_D$ | $\nu_D$ | $T_g$ |
| --- | --- | --- | --- |
| Brominated phenoxyether polymer | 1.64 | 24 | 149 |
| Chlorinated phenoxyether polymer | 1.63 | 25 | 140 |
| Polyethylene naphthalate | 1.65 | 19 | 113 |
| Polyvinylnaphthalene | 1.68 | 21 | 158 |
| Polyvinylcarbazole | 1.68 | 19 | 84 |
| Poly(p-divinylbenzene) | 1.62 | 28 | 106 |

The polymer films heretofore proposed as phase difference films are deviating from the above-mentioned range of refractive index $n_D$, Abbe number $\nu_D$ or glass transition temperature $T_g$ and are, therefore, not effective enough to accomplish the objectives.

Polycarbonate: $n_D = 1.58 – 1.59$
Polymethyl methacrylate: $n_D = 1.49$, $\nu_D = 57$
Polyvinyl alcohol: $n_D = 1.49 – 1.53$
Polyethylene terephthalate: $n_D = 1.53$
Polyethylene: $n_D = 1.51$
Polypropylene: $n_D = 1.49$
Polyvinyl chloride: $n_D = 1.54 – 1.55$
Polysulfone: $T_g > 160°$ C.
Polyethersulfone: $T_g > 160°$
Polyarylate. $n_D = 1.61$, $\nu_D = 26$, $T_g = 215°$ C.
Polystyrene: $n_D = 1.59$, $\nu_D = 31$
Polyphenylene oxide: $T_g = 209°$ C.
Polyacrylonitrile: $n_D = 1.52$, $\nu_D = 52$
Cellulosic polymer: $n_D = 1.49 – 1.51$
Amorphous polyolefin: $n_D = 1.52$
Nylon 66: $n_D 1.52 – 1.53$, $\nu_D = 40$
ABS resin: $n_D = 1.54$
Polyester copolymer: $n_D = 1.52 – 1.57$
Phenoxyether polymer, neither brominated nor chlorinated: $n_D < 1.60$
Polytetrafluoroethylene: $n_D = 1.35$ It is particularly desirable that said first oriented film (1) has a wavelength dispersion value of $\nu_{RF} \geq 1.10$. The wavelength dispersion value $\nu_{RF}$ is an indicator which is defined by the following equation.

$$\nu_{RF} = \Delta n \cdot d \ (450 \ nm)/\Delta n \cdot d \ (590 \ nm)$$

If this value is less than 1.10, the dispersibility will be inadequate so that the problems of coloration and low contrast ratio of the display cannot be solved. The wavelength dispersion value $v_{RF}$ preferably approximates the value of the liquid crystal, namely 1.10 to 1.18. However, depending on compensating conditions for the liquid crystal cell, there are cases in which a marked color compensation effect can be obtained even at a large value of 1.2.

The research conducted by the inventors of the present invention led to the finding that when a polymer film having a refractive index of $n_D \geq 1.60$, an Abbe number of $v_D \leq 30.0$ and a glass transition temperature of 60°–160° C. is oriented in at least one direction, the resulting oriented film has an increased wavelength dispersion value $v_{RF}$. Therefore, it is important to select the proper thickness and drawing conditions for polymer film so that the wavelength dispersion value $v_{RF}$ of the first oriented film (1) will be not less than 1.10.

The polymer film having the above characteristic values can be obtained by the casting or melt-forming technology. Drawing of polymer films is generally carried out at or around a temperature higher than the glass transition temperature $T_g$ by 5° to 40° C., particularly about 10° to 30° C., and the drawing is preferably followed by aging. In many cases, the draw ratio is approximately 1.1 to 6, particularly 1.2 to 4, per direction. It is also possible to draw film in one direction with restriction of draw ratio in a perpendicular direction or restriction of shrinkage in a perpendicular direction and, in such a case, the film becomes a biaxially oriented film.

Second oriented film (2)

The second oriented film (2) is an oriented film obtainable by drawing, at least in one direction, a polymer film having a refractive index $n_D$ value of less than 1.60. However, if the refractive index $n_D$ is reduced too much, random reflection tends to occur at the interface with the first oriented film (1). Therefore, the refractive index $n_D$ is preferably not less than 1.50.

The polymer film for the production of the second oriented film (2), unlike the polymer film for the production of the first oriented film (1), is not particularly limited in the aspect of Abbe number $v_D$ and may be either less than 30.0 or more than 30.0. However, since few films have Abbe numbers less than 30.0, it is usual that the Abbe number exceeds 30.0. This film is not limited in glass transition temperature $T_g$, either, but this characteristic value is preferably not higher than 160° C. from the standpoint of ease of drawing. Since the heat resistance is compensated for by the first oriented film (1), the glass transition temperature $T_g$ may be lower than 60° C.

As examples of the polymer for this polymer film, there can be mentioned polycarbonate, phenoxyether polymer, polystyrene, polyvinyl alcohol, polyvinyl chloride, polyvinylidene chloride, cellulose triacetate, epoxy resin, ABS resin and so on.

Laminate film

The optical compensator of the present invention comprises a first oriented film (1) and a second oriented film (2). The laminar structure is optional and may for example be (1)/(2), (1)/(2)/(1), (1)/(1)/(2), (2)/(1)/(2) or (2)/(1)/(2)/(2).

It is particularly preferable that the retardation value R of the laminate film be 60 to 1000 nm. If the retardation value R of the laminate film is less than 60 nm, the phase difference function will be inadequate. On the other hand, when the retardation value R exceeds 1000 nm, the film thickness must be markedly increased but if it be so done, the optional homogeneity is sacrificed and the hue compensating effect is reduced.

The retardation value R, referred to above, is an indicator which can be expressed by the following equation.

$$R = d \cdot |n_1 - n_2| = \Delta n \cdot d$$

(wherein d represents the thickness of film, $n_1$ represents the refractive index in the direction of optic axis or the direction at right angles therewith, $n_2$ represents the refractive index in the direction perpendicular to the direction of $n_1$, and the refractive index is a value relative to the sodium D line).

The optical compensator may be constituted of such a laminate film alone but an optically isotopic film (3) may be further laminated at least on one side of the laminate film for purposes of protection.

The optically isotopic film (3) for such purposes includes the films of, among others, cellulosic polymer (e.g. cellulose triacetate), polycarbonate, polyparabanic acid resin, polystyrene, polyethersulfone, polyarylene ester, polysulfone, polyvinyl chloride, poly-4-methylpentene, polyphenylene oxide, oxygenimpermeable resin, crosslinked resin and so on.

The oxygen-impermeable resin mentioned above includes polyvinyl alcohol, ethylene-vinyl alcohol copolymer, polyacrylonitrile, polyvinylidene chloride, etc. and the crosslinked resin includes crosslinked phenoxyether resin, epoxy resin, acrylate resin, acrylepoxy resin, urethane resin, etc. Not only a single-layer film but also a composite film such as an ethylene-vinyl alcohol copolymer/phenoxyether crosslinked resin film can be employed. The retardation value of the optically isotropic film is preferably not greater than 30 nm and, for still better results, not greater than 10 nm.

The ease of handling up to the fabrication of a liquid crystal display can be insured by laminating a release sheet (5) through a pressure-sensitive adhesive layer (4) on at least one side of the optical compensator of the present invention.

The optical compensator of the invention can be assembled with a polarizer to provide a optical compensator equipped with a polarizer or used as the substrate of a liquid crystal cell or laminated with a liquid crystal cell substrate prior to the fabrication of the liquid crystal cell to provide a liquid crystal cell panel equipped with a optical compensator.

Operation

As mentioned hereinbefore, it was discovered that when a polymer film having a refractive index of $n_D \geq 1.60$, an Abbe number of $v_D \leq 30.0$ and a glass transition temperature $T_g$ of 60°–160° C. is oriented in at least one direction, the wavelength dispersion value $v_{RF}$ is increased as an "attribute" of such film. Therefore, the first oriented film (1) having a wavelength dispersion value of not less than 1.10 can be obtained by selecting and drawing a polymer film having such characteristic value. Since this first oriented film (1) has a large wavelength dispersion value $v_{RF}$, the use of this film as an optically compensating film results in marked improvements in coloration and contrast ratio.

However, if this first oriented film (1) is used alone, it is impossible to obtain an optical compensator having a retardation value in the range of 60 to 1000 nm, particularly in the optimum range of 500 to 700 nm, unless the film thickness is sufficiently increased. However, since the first oriented film (1) is expensive, it is costwise disadvantageous to increase the thickness of the first oriented film (1), and in addition, increasing the film thickness tends to increase the difficulty to insure optical homogeneity. Moreover, it is not necessarily easy, in terms of film-forming technology and drawing technology, to manufacture the first oriented film of substantial thickness. Therefore, by taking advantage of the addition property of retardation values R, the deficiency in retardation value R is compensated for by laminating (1) with the second oriented film (2) and at the same time paying attention to the refractive index $n_D$ of polymer film for the second oriented film (2), it is insured that no random reflection will occur between the first oriented film (1) and second oriented film (2). It should be understood that two or more units of the optical compensator of the invention can be assembled into a single liquid crystal display device.

Effects of Invention

Since the optical compensator of the present invention has both a necessary retardation value R and a necessary wavelength dispersion value $v_{RF}$ thanks to an ingenious combination of said first oriented film (1) and second oriented film (2), the liquid crystal display incorporating this optical compensator is remarkably improved in the coloration and contrast ratio which are the drawbacks of the FTN mode while the advantages of the mode, namely its minimal weight and thickness as well as brightness, are exploited.

The legends used on the drawings have the following meanings.

| | |
|---|---|
| (1) | First oriented film |
| (2) | Second oriented film |
| (3) | Optically isotropic film |
| (4) | Pressure-sensitive adhesive layer |
| (5) | Release sheet |
| (101) | Upper polarizer |
| (102) | Liquid crystal cell |
| (103) | Substrate |
| (104) | Transparent electrode |
| (105) | Oriented film |
| (106) | Spacer |
| (107) | Liquid crystal |
| (108) | Lower polarizer |
| (109) | Optical compensator |
| (201) | Upper polarizer |
| (202) | Liquid crystal cell |
| (203) | Substrate |

-continued

| | |
|---|---|
| (204) | Transparent electrode |
| (205) | Oriented film |
| (206) | Spacer |
| (207) | Liquid crystal |
| (208) | Lower polarizer |
| (209) | Optical compensator |
| (210) | Optical compensator |
| (301) | Upper polarizer |
| (302) | Liquid crystal cell |
| (303) | Substrate |
| (304) | Transparent electrode |
| (305) | Oriented film |
| (306) | Spacer |
| (307) | Liquid crystal |
| (308) | Lower polarizer |
| (309) | Optical compensator |
| (310) | Optical compensator |
| (401) | Angle of twist of liquid crystal |
| (402) | Direction of rubbing of upper substrate |
| (403) | Angle from horizontal direction to direction of rubbing of upper substrate |
| (404) | Direction of rubbing of lower substrate |
| (405) | Direction of polarization axis of upper polarizer |
| (406) | Angle from horizontal direction to direction of polarization axis of upper polarizer |
| (407) | Direction of polarization axis of lower polarizer |
| (408) | Angle from horizontal direction to direction of polarization axis of lower polarizer |
| (409) | Direction of orientation axis of optical compensator |
| (410) | Angle from horizontal direction to direction of orientation axis of optical compensator |
| (501) | Angle of twist of liquid crystal |
| (502) | Direction of rubbing of upper substrate |
| (503) | Angle from horizontal direction to direction of rubbing of upper substrate |
| (504) | Direction of rubbing of lower substrate |
| (505) | Direction of polarization axis of upper polarizer |
| (506) | Angle from horizontal direction to direction of polarization axis of upper polarizer |
| (507) | Direction of polarization axis of lower polarizer |
| (508) | Angle from horizontal direction to direction of polarization axis of lower polarizer |
| (509) | Direction of orientation axis of upper optical compensator |
| (510) | Angle from horizontal direction to direction of orientation axis of upper optical compensator |
| (511) | Direction of orientation axis of lower optical compensator |
| (512) | Angle from horizontal direction to direction of orientation axis of lower optical compensator |

BEST MODE FOR CARRYING OUT THE INVENTION

The following examples are further illustrative of the invention. In the following disclosure, all parts are by weight.

EXAMPLE 1

Figure 1:
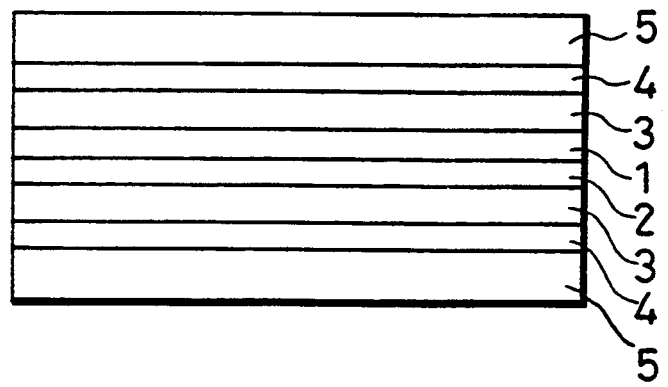
FIG. 1 is a sectional view showing an exemplary optical compensator of the present invention.

FIG. 1 is a sectional view showing an example of the optical compensator of the invention.

First oriented film (1)

A solution prepared by dissolving 25 parts of a brominated phenoxyether resin with a bromine content of 52.9 weight % (Tohto Kasei Co., Ltd., YPB-43C), the chemical formula of which is presented below (formula 1), in 75 parts of a 60:40 w/w mixture of cyclohexanone and dioxane was cast on a polyester film base and partially dried until the solvent residue was 5 weight %. The resulting film was exfoliated from the polyester film and dried until there was no solvent residue. The film thus obtained had a thickness of 70 μm, a refractive index of $n_D = 1.64$, an Abbe number of $v_D = 24$, a DSC glass transition temperature of $T_g = 149°$ C., a retardation value of R=2 nm, and a thermal deformation temperature of 111° C. (JIS K6911).

This film was drawn 3-fold in one direction at a temperature of 155° C. and subjected to aging at the same temperature for 2 seconds, after which both edges were trimmed off. The above procedure gave a first oriented film (1) having a thickness of 42 μm, a retardation value of 480 nm and a wavelength dispersion value of $v_{RF} = 1.14$.

Second oriented film (2)

A polycarbonate film was prepared by casting. This film had a thickness of 80 μm, a refractive index of $n_D = 1 59$, an Abbe number of $v_D = 30.3$, a glass transition temperature of $T_g = 135°$ C. and a retardation value of R=4 nm.

The above film was then drawn 1.5-fold in one direction at 168° C. and subjected to aging at the same temperature for 10 seconds, after which both edges were trimmed off. The above procedure gave a second oriented film (2) having a thickness of 64 μm, a retardation value of R=98 nm and a wavelength dispersion value of $v_{RF} = 1.09$.

Optical compensator

The above first oriented film (1) and second oriented film (2) were laminated with an acrylic adhesive in such a manner that the respective directions of orientation would be parallel. Then, optically isotropic films (3), (3) each comprising a 50 μm cellulose triacetate film were laminated on respective sides of the above laminate film with an urethane adhesive to provide an optical compensator having a laminar structure of (3)/(1)/(2)/(3). This optical compensator had a retardation value of R=578 nm and a wavelength dispersion value of $v_{RF} = 1.13$.

Optical compensator with release sheet

Figure 2:
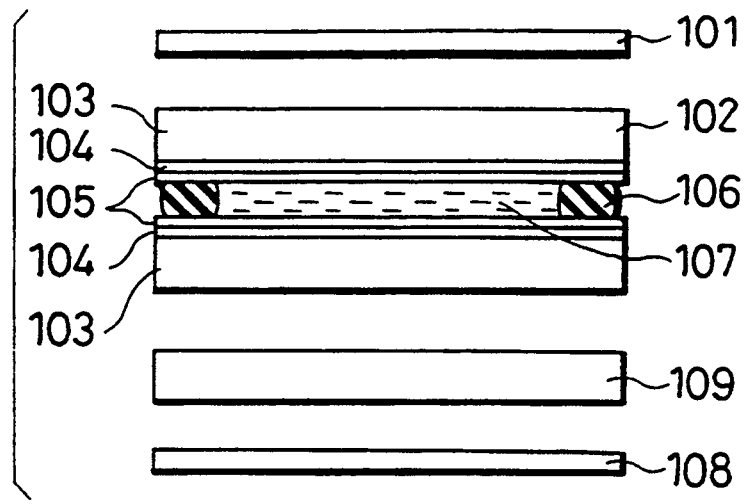
FIG. 2 is a schematic view showing the architecture of a liquid crystal display device incorporating the optical compensator of the invention.
Figure 5:
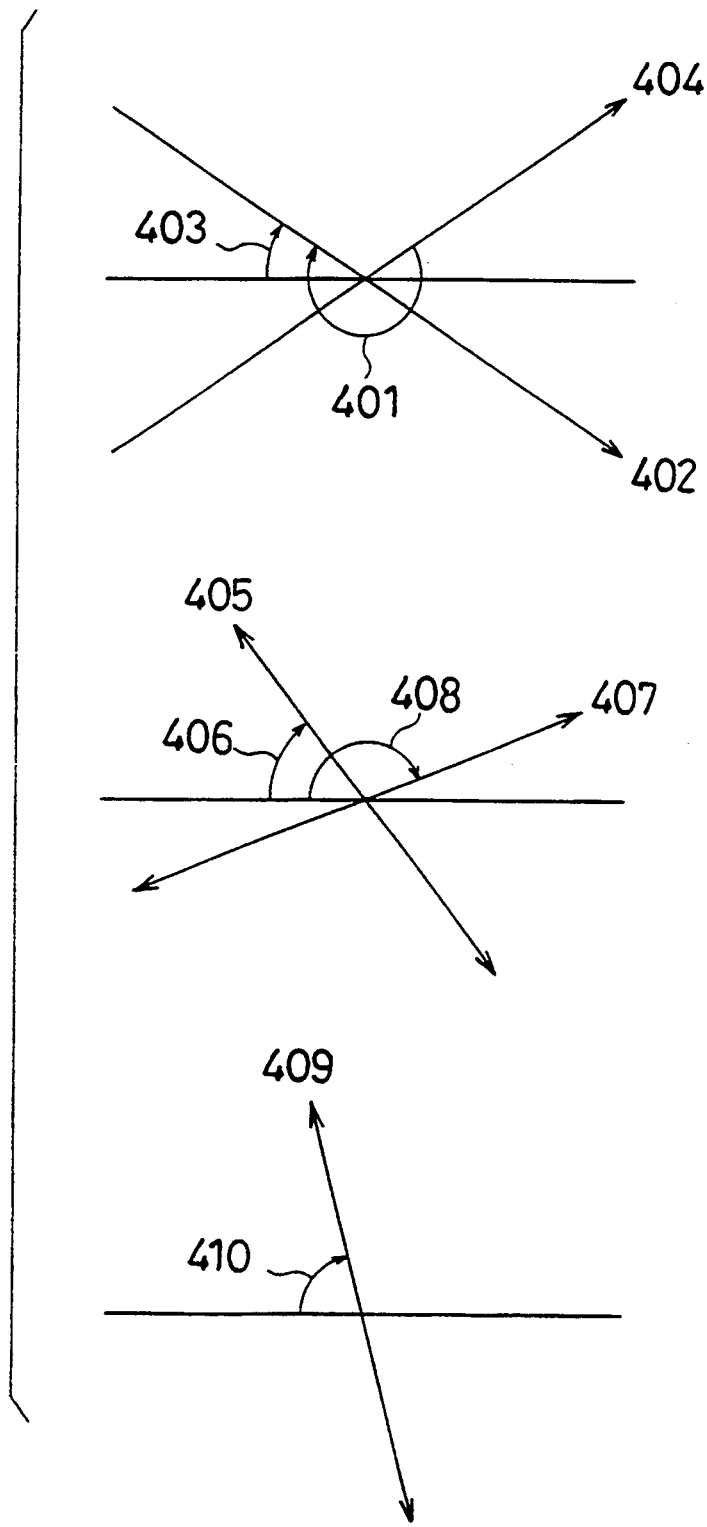
FIG. 5 is a diagram showing the orientational relationship of axes in the liquid crystal display used in the examples of the invention.

A release sheet (5) having a pressure-sensitive adhesive layer (4) was prepared by applying a acrylic pressure-sensitive adhesive in a thickness of 30 μm on a release-treated side of a 40 μm-thick polyester film release sheet and this release sheet was laminated on either side of the optical compensator prepared above. To put the optical compensator to use, the release sheet (5) only is peeled off and the remainder is bonded to the substrate. Using this optical compensator, a liquid crystal display device comprising the polarizer/liquid crystal cell/optical compensator/polarizer was fabricated. FIG. 2 is a schematic view showing a liquid crystal display incorporating the optical compensator of this example. The liquid crystal cell (102) contains a liquid crystal (107) in the space defined by juxtaposed substrates (103) each carrying transparent electrodes (104) and rubbed oriented films (105) with the interposition of spacer means (106). The optical compensator (109) is positioned below said liquid crystal cell (102) and the assembly is sandwiched between the upper polarizer (101) and lower polarizer (108). FIG. 5 shows the orientational relationship of axes in the liquid crystal display of FIG. 2 as viewed from top. The reference numeral (401) stands for the angle of twist of the liquid crystal, (403) for the angle from the horizontal direction to the direction of rubbing (402) of the upper substrate of the liquid crystal cell, (404) for the direction of rubbing of the lower substrate of the liquid crystal cell, (406) for the angle from the horizontal direction to the direction of polarization axis (405) of the upper polarizer, (408) for the angle from the horizontal direction to the direction of polarization axis of the lower polarizer, and (410) for the angle from the horizontal direction to the direction of orientation axis (409) of the optical compensator. The direction of angle is positive when it is clockwise. The product Δnd of refractive index anisotropy Δn of liquid crystal and cell thickness d was 0.86 μm. The angle of twist (401) of liquid crystal was set at 240° clockwise from down to up, the angle (403) was set at 30°, the angle (406) at 65°, the angle (408) at 95°, and the angle (410) at 50°. The polarizer used here comprised a polyvinyl alcohol-iodine polarizing film and a cellulose triacetate film bonded to either side thereof and had a visible light transmissivity of 42% and a polarization degree of 99%. The liquid crystal sealed in the liquid crystal cell was a nematic liquid crystal giving a wavelength dispersion value of $v_{LC} = 1.14$. This liquid crystal was a composition which can be represented by the following chemical formula (2).

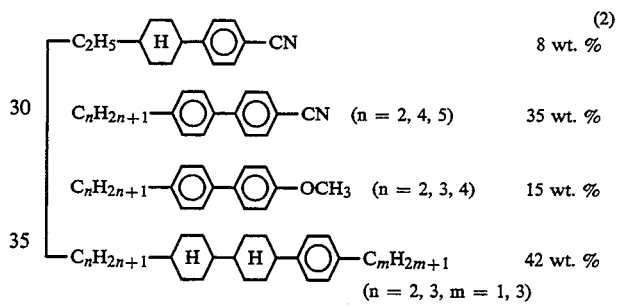

This liquid crystal display had been improved remarkably in coloration and contrast ratio and somewhat in brightness, too, thus being substantially comparable to a liquid crystal display using a hue-compensating liquid crystal cell.

EXAMPLE 2

First oriented film (1)

A polyethylene naphthalate film obtained by melt-molding was provided. This film had a thickness of 80 μm, a refractive index of $n_D = 1.65$, an Abbe number of $v_D = 18$ and a DSC glass transition temperature of $T_g = 113°$ C.

This film was then drawn 1.9-fold in one direction at a temperature of 130° C. and subjected to 4 seconds of aging at the same temperature, after which both edges were trimmed off. The above procedure gave a first oriented film (1) having a thickness of 60 μm, a retardation value of R=420 nm and a wavelength dispersion value of $v_{RF} = 1.18$.

Second oriented film (2)

A polycarbonate film was prepared by the casting technique. This film had a thickness of 80 μm, a refractive index of $n_D = 1.58$, an Abbe number of $v_D = 30.3$, a glass transition temperature of $T_g = 135°$ C. and a retardation value of R=150 nm.

This film was then drawn 1.6-fold in one direction at 170° C. and subjected to 8 seconds of aging at the same temperature, after which both edges were trimmed off. This procedure gave a second oriented film having a thickness of 62 μm, a retardation value of R=150 nm and a wavelength dispersion value of $v_{RF}=1.09$.

Optical compensator

The above first oriented film (1) and second oriented film (2) were laminated with an acrylic adhesive in such a manner that the directions of orientation of the two films would be parallel. Then, a couple of optically isotropic films (3),(3) each comprising a 50 μm thick cellulose triacetate film were bonded to respective sides of the above laminate to fabricate an optical compensator having an architecture of (3)/(1)/(2)/(3). This optical compensator had a retardation value of R=555 nm and a wavelength dispersion value of $v_{RF}=1.16$.

Using the above optical compensator, a liquid crystal display was fabricated in otherwise the same manner as Example 1. This liquid crystal display had been remarkably improved in coloration and contrast ratio and was substantially comparable to a liquid crystal display incorporating a hue compensating LC cell.

EXAMPLE 3

The procedure of Example 1 was repeated except that chlorinated phenoxyether resin was used in lieu of brominated phenoxyether resin. The result was as satisfactory as the result obtained in Example 1.

Comparative Example 1

A polycarbonate film was prepared by the casting technique. This film had a thickness of 170 μm, a refractive index of $n_D=1.58$, an Abbe number of $v_D=30.3$, a glass transition temperature of Tg=140° C. and a retardation value of R=7 nm.

This film was then drawn 2-fold in one direction at 170° C. and subjected to 6 seconds of aging at 165° C., after which both edges were trimmed off. The procedure gave an oriented film having a thickness of 110 μm, a retardation value of R=570 nm and a wavelength dispersion value of $v_{RF}=1.09$.

Then, a couple of optically isotropic films each comprising a 50 μm thick cellulose triacetate film were bonded to respective sides of the above oriented film with an urethane adhesive to fabricate an optical compensator.

Using this optical compensator, a liquid crystal display was fabricated as in Example 1. This liquid crystal display showed an intense blue color and had a low contrast ratio.

Comparative Example 2

The procedure of Comparative Example 1 was repeated using polymethyl methacrylate, polyvinyl alcohol, ethylene-vinyl alcohol copolymer, polyethylene terephthalate, polybutylene terephthalate, polyethylene, polypropylene, polyvinyl chloride, polystyrene, phenoxyether polymer and polyacrylonitrile. Thus, each of these polymers was cast into a film and monoaxially oriented with a draft ratio of 1.5 to 4 and a couple of optically isotropic films each comprising a cellulose triacetate film were laminated on respective sides of the oriented film to fabricate an optical compensator. Using this optical compensator, a liquid crystal display was constructed and evaluated. As a result, all the displays showed similar colorations and had low contrast ratios just as in Comparative Example 1.

EXAMPLE 4

A polyethylene naphthalate film having a refractive index of $n_D=1.65$, an Abbe number of $v_D=18$ and a DSC glass transition temperature of Tg=113° C. was drawn in one direction and aged to provide a first oriented film (1a), (1b) having a wavelength dispersion value of $v_{RF}=1.18$.

On the other hand, a polycarbonate film having a refractive index of $n_D=1.58$, an Abbe number of $v_D32$ 30.3 and a DSC glass transition temperature of 135° C. was drawn in one direction and aged to provide a second oriented film (2a), (2b) having a wavelength dispersion value of $v_{RF}=1.09$.

Figure 3:
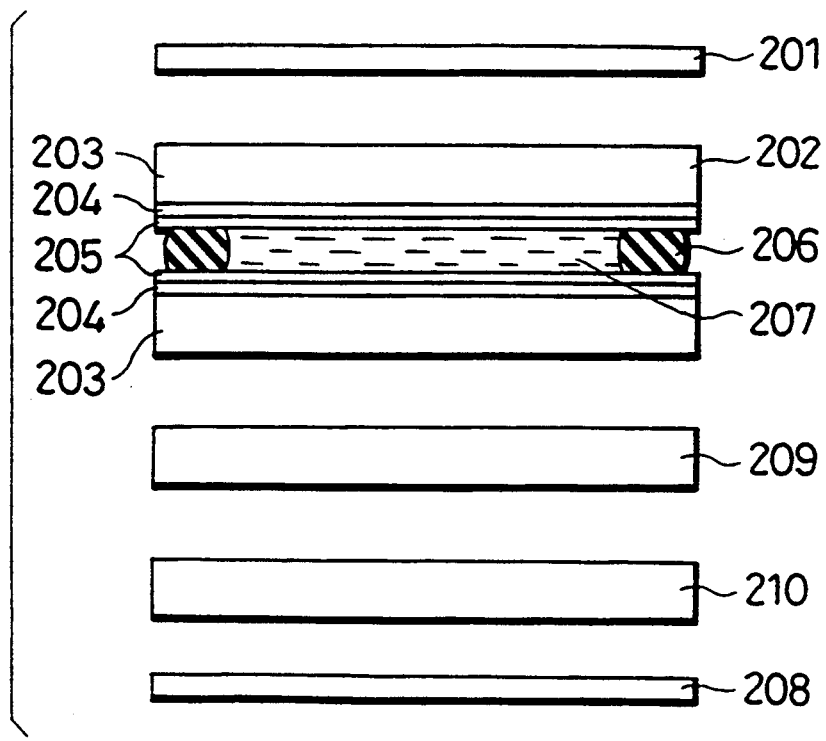
FIG. 3 is a schematic view showing the architecture of a liquid crystal display device incorporating the optical compensator of the invention.
Figure 6:
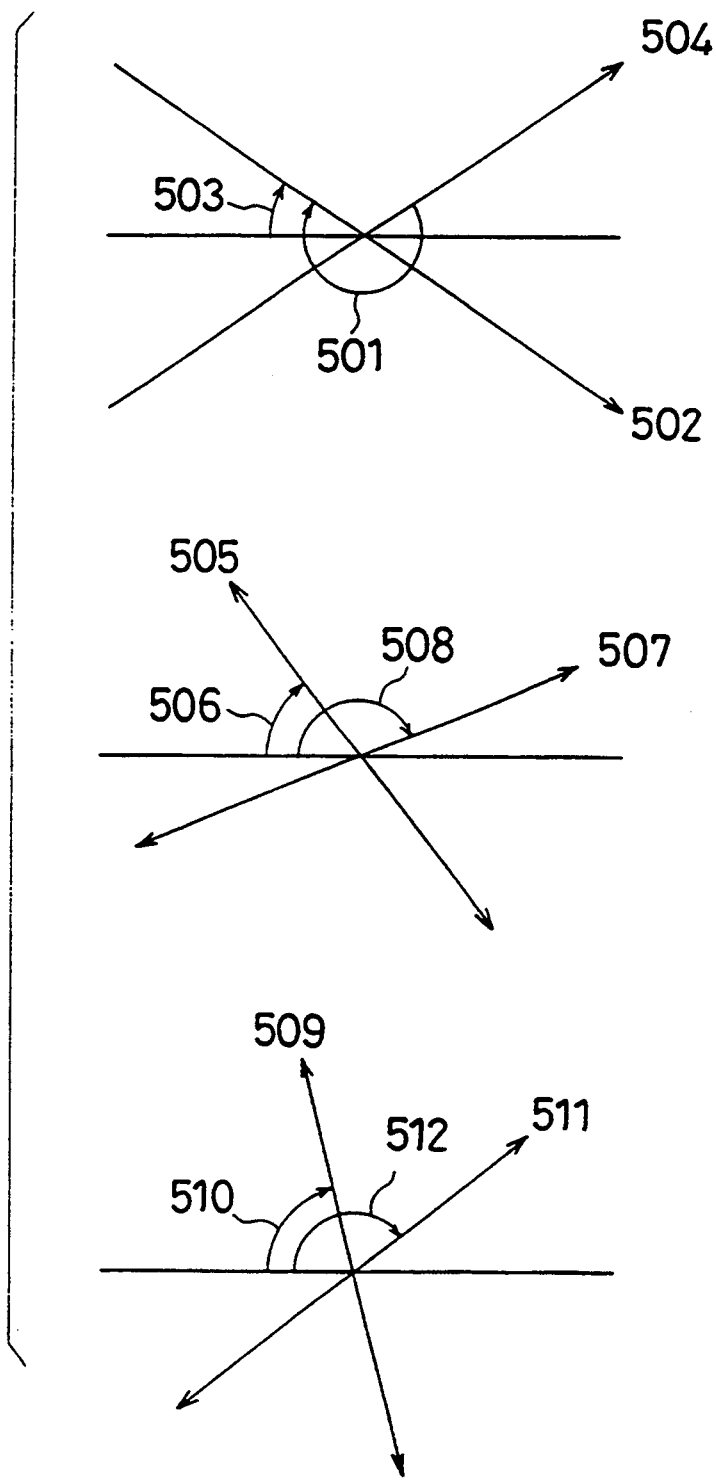
FIG. 6 is a diagram showing the orientational relationship of axes in the liquid crystal display used in the examples of the invention.

With the retardation value R of the above first oriented film (1a) being set to R=320 nm and the retardation value R of the second oriented film (2a) to R=100 nm, these films were laminated with an acrylic adhesive in such a manner that the respective directions of orientation would be parallel and a couple of optically isotropic films (3), (3) each comprising a 50 μm thick cellulose triacetate film were bonded to respective sides of the laminate with an urethane adhesive to provide an optical compensator having a laminar structure of (3)/(1a)/(2)/(3). This optical compensator had a retardation value of R=420 nm and a wavelength dispersion value of $v_{RF}=1.16$. Using two units of this optical compensator film, a liquid crystal display having a structure of polarizer/liquid crystal cell/optical compensator/optical compensator/polarizer was fabricated. FIG. 3 is a schematic view of this liquid crystal display. The liquid crystal cell (202) contains a liquid crystal (207) in the space defined by juxtaposed substrates (203) each carrying transparent electrodes (204) and rubbed oriented films (205) with the interposition of spacer means (206). Disposed below this liquid crystal cell (202) are said optical compensators (209), (210) and the assembly is sandwiched between an upper polarizer (201) and a lower polarizer (208). The orientational relationship of axes in this liquid crystal display as viewed from the top of FIG. 3 is shown in FIG. 6. The reference numeral (501) stands for the angular dimension of twist of the liquid crystal, (503) for the angle from the horizontal direction to the direction of rubbing (502) of the upper substrate of liquid crystal cell (202), (504) for the direction of rubbing of the lower substrate of liquid crystal cell (202), (506) for the angle from the horizontal direction to the direction of polarization axis (505) of the upper polarizer, (508) for the angle from the horizontal direction to the direction of polarization axis (507) of the lower polarizer, (510) for the angle from the horizontal direction to the direction of orientation axis (509) of the upper optical compensator, and (512) for the angle from the horizontal direction to the direction of orientation axis (511) of the lower optical compensator. The clockwise angle is positive. The product Δn·d of refractive index anisotropy Δn of liquid crystal and cell thickness d was 0.86 μm. The angle of twist (501) of the liquid crystal was set, in the clockwise direction from down to top, at 204°, the angle (503) at 30° C. the angle (506) at 0°, the angle (508) at 90°, the angle (510) at 70°, and the angle (512) at 30°. This liquid crystal display had been much more improved in coloration and contrast ratio as compared with the liquid crystal display of Example 2 and was fully comparable to a liquid crystal display incorporating a hue compensating liquid crystal cell.

Figure 4:
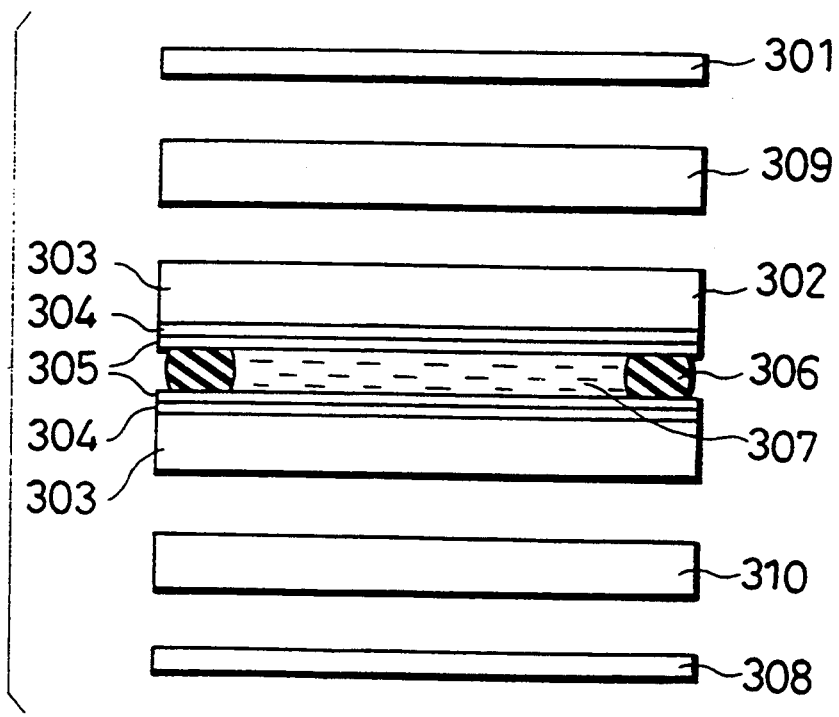
FIG. 4 is a schematic view showing the architecture of a liquid crystal display incorporating the optical compensator of the invention.

With the retardation value of the above first oriented film (1a) being set to R=300 nm and the retardation value of the second oriented film (2a) to R =100 nm, these films were laminated with an acrylic adhesive in such a manner that the respective directions of orientation would be parallel and a couple of optically isotropic films (3) each comprising a 50 μm thick cellulose triacetate film were bounded to respective sides of the above laminate with an urethane adhesive to provide an optical compensator having a laminar structure of (3)/(1a)/(2a)/(3). This optical compensator had a retardation value of R=400 nm and a wavelength dispersion value of $v_{RF}$=1.16. Using two units of this optical compensator, a liquid crystal display having an architecture of polarizer/optical compensator/liquid crystal cell-/optical compensator/polarizer was fabricated. FIG. 4 is a schematic illustration of this liquid crystal display. The liquid crystal cell (302) contains a liquid crystal (307) in the space defined by juxtaposed substrates (303) each carrying a transparent electrode (304) and a rubbed oriented film (305) with the interposition of spacer means (306). The optical compensators (309) and (310) are disposed on respective sides of the above liquid crystal cell (302) and the assembly is sandwiched between the upper polarizer (301) and the lower polarizer (308). The orientational relationship of axes in the liquid crystal display of FIG. 4, viewed from up, is similar to that shown in FIG. 6. Here, too, the clockwise direction of angle is positive. The product Δnd of the refractive index anisotropy of liquid crystal Δn and cell thickness d was set to 0.86 μm. The angle of twist (501) of the liquid crystal, in the clockwise direction from down to top, was set at 240°, the angle (503) at 30°, the angle (506) at 80°, the angle (508) at 10°, the angle (510) at 110° and the angle (512) at 70°. This liquid crystal display had been much more improved in coloration and contrast ratio as compared with the CLD of Example 2 and was fully comparable to a liquid crystal display incorporating a hue compensating liquid crystal cell.

Using the liquid crystal cell described in Example 1, the following liquid crystal displays were fabricated.

1. Polarizer/(1a)/(2a)/(1b)/liquid crystal cell/polarizer
2. Polarizer/(1a)/(2a)/(1b)/(2b)/liquid crystal cell/polarizer
3. Polarizer/(1a)/(1b)/(2a)/(2b)/liquid crystal cell/polarizer
4. Polarizer/(1a)/(2a)/liquid crystal cell/(1b)/polarizer
5. Polarizer/(1a)/(2a)/liquid crystal cell/(1b)/(2b)/polarizer
6. Polarizer/(1a)/(2a)/liquid crystal cell/(2b)/(1b)/polarizer
7. Polarizer/(1a)/(2a)/(1b)/liquid crystal cell/(1a)/(2b)/(1b)/polarizer
8. Polarizer/(1a)/(2a)/(1b)/(2b)/liquid crystal cell/(1a)/(2a)/(1b)/(2b)/polarizer In the above structures 1 through 8, the retardation values R of the first oriented film (1a), (1b) and second oriented film (2a), (2b) were set according to the respective structures. These liquid crystal displays had been still more improved in coloration and contrast ratio as compared with the LCD of Example 2, being fully comparable to a liquid crystal display incorporating a color compensating liquid crystal cell.

INDUSTRIAL APPLICABILITY

The optical compensator of the present invention is particularly useful for optical compensation in an STN (supertwisted nematic) liquid crystal display, there is to say on the FTN mode. In addition, it can be used in such applications as goggle transparent and antiglare transparent parts, optical filters and so on.

We claim:

1. An optical compensator comprising a laminate, wherein the laminate comprises:
   (1) at least one oriented film of a first type obtained by stretching, in at least one axis, a polymer film having a refractive index $n_D \geq 1.60$, an Abbe number $v_D \leq 30.0$ and a glass transition temperature Tg=60° to 160° C., and
   (2) at least one oriented film of a second type laminated to said oriented film of the first type, said oriented film of the second type being obtained by stretching, in at least one axis, a polymer film having a refractive index $n_D < 1.60$,
   wherein the oriented film of the first type has at least one axis of orientation which is parallel to an axis of orientation of the oriented film of the second type.

2. The optical compensator of claim 1, wherein the laminate film has a retardation value R=60 to 1000 nm, and the oriented film of the first type has a wavelength dispersion value $v_{RF}$ of not less than 1.10, wherein $v_{RF}$ is defined by the following equation:

$$v_{RF} = \frac{\Delta n \cdot d \text{ at 450 nm}}{\Delta n \cdot d \text{ at 590 nm}}$$

wherein Δn is the refractive index of the oriented film of the first type and d is the thickness of the oriented film of the first type.

3. The optical compensator of claim 1, wherein the laminate has a structure represented by (1)/(2), wherein (1) is an oriented film of the first type and (2) is an oriented film of the second type.

4. The optical compensator of claim 1, wherein the laminate has a structure represented by (1)/(2)/(1), wherein (1) is an oriented film of the first type and (2) is an oriented film of the second type.

5. The optical compensator of claim 1, wherein the laminate has a structure represented by (1)/(1)/(2), wherein (1) is an oriented film of the first type and (2) is an oriented film of the second type.

6. The optical compensator of claim 1, wherein the laminate has a structure represented by (2)/(1)/(2), wherein (1) is an oriented film of the first type and (2) is an oriented film of the second type.

7. The optical compensator of claim 1, wherein the laminate has a structure represented by (2)/(1)/(2)/(2), wherein (1) is an oriented film of the first type and (2) is an oriented film of the second type.

8. The optical compensator of claim 1, wherein the laminate has a structure represented by (1a)/(2a)/(1b), wherein (1a) is an oriented film of the first type, (1b) is an oriented film of the first type, and (2a) is an oriented film of the second type.

9. The optical compensator of claim 1, wherein the laminate has a structure represented by (1a)/(2a)/(1b)/(2b), wherein (1a) is an oriented film of the first type, (1b) is an oriented film of the first type, (2a) is an oriented film of the second type, and (2b) is an oriented film of the second type.

10. The optical compensator of claim 1, wherein the laminate has a structure represented by (1a)/(1b)/(2a)/(2b), wherein (1a) is an oriented film of the first type, (1b) is an oriented film of the first type, (2a) is an oriented film of the second type, and (2b) is an oriented film of the second type.

11. A liquid crystal display comprising:

(a) a liquid crystal cell, (b) a pair of polarizers disposed on respective sides of said liquid crystal cell; and (c) at least one optical compensator interposed between said liquid crystal cell and one polarizer of said pair of polarizers, said optical compensator comprising a laminate which comprises:

(1) at least one oriented film of a first type obtained by stretching, in at least one axis, a polymer film having a refractive index $n_D \geq 1.60$, an Abbe number $\nu_D \leq 30.0$ and a glass transition temperature $Tg = 60°$ to $160°$ C., and (2) at least one oriented film of a second type laminated to said oriented film of the first type, said oriented film of the second type being obtained by stretching, in at least one axis, a polymer film having a refractive index $n_D < 1.60$, wherein the oriented film of the first type has at least one axis of orientation which is parallel to an axis of orientation of the oriented film of the second type.

12. The liquid crystal display of claim 11, wherein the laminate film has a retardation value $R = 60$ to $1000$ nm, and the oriented film of the first type has a wavelength dispersion value $\nu_{RF}$ of not less than 1.10, wherein $\nu_{RF}$ is defined by the following equation:

$$\nu_{RF} = \frac{\Delta n \cdot d \text{ at } 450 \text{ nm}}{\Delta n \cdot d \text{ at } 590 \text{ nm}}$$

wherein $\Delta n$ is the refractive index of the oriented film of the first type and d is the thickness of the oriented film of the first type.

13. The liquid crystal display of claim 12, wherein the laminate has a structure represented by (1)/(2), wherein (1) is an oriented film of the first type and (2) is an oriented film of the second type.

14. The liquid crystal display of claim 12, wherein the laminate has a structure represented by (1)/(2)/(1), wherein (1) is an oriented film of the first type and (2) is an oriented film of the second type.

15. The liquid crystal display of claim 12, wherein the laminate has a structure represented by (1)/(1)/(2), wherein (1) is an oriented film of the first type and (2) is an oriented film of the second type.

16. The liquid crystal display of claim 12, wherein the laminate has a structure represented by (2)/(1)/(2), wherein (1) is an oriented film of the first type and (2) is an oriented film of the second type.

17. The liquid crystal display of claim 12, wherein the laminate has a structure represented by (2)/(1)/(2)/(2), wherein (1) is an oriented film of the first type and (2) is an oriented film of the second type.

18. The liquid crystal display of claim 12, wherein the laminate has a structure represented by (1a)/(2a)/(1b), wherein (1a) is an oriented film of the first type, (1b) is an oriented film of the first type, and (2a) is an oriented film of the second type.

19. The liquid crystal display of claim 12, wherein the laminate has a structure represented by (1a)/(2a)/(1b)/(2b), wherein (1a) is an oriented film of the first type, (1b) is an oriented film of the first type, (2a) is an oriented film of the second type, and (2b) is an oriented film of the second type.

20. The liquid crystal display of claim 12, wherein the laminate has a structure represented by (1a)/(1b)/(2a)/(2b), wherein (1a) is an oriented film of the first type, (1b) is an oriented film of the first type, (2a) is an oriented film of the second type, and (2b) is an oriented film of the second type.

* * * * *